United States Patent
Rothman et al.

(10) Patent No.: US 8,185,886 B2
(45) Date of Patent: May 22, 2012

(54) METHOD AND APPARATUS TO ENABLE DYNAMICALLY ACTIVATED FIRMWARE UPDATES

(75) Inventors: Michael A. Rothman, Sammamish, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1365 days.

(21) Appl. No.: 11/768,356

(22) Filed: Jun. 26, 2007

(65) Prior Publication Data
US 2009/0007089 A1 Jan. 1, 2009

(51) Int. Cl.
*G06F 9/44* (2006.01)
(52) U.S. Cl. ......... 717/173; 717/171; 717/172; 717/178
(58) Field of Classification Search ............. 717/168, 717/171, 174, 176, 172, 173, 177, 178
See application file for complete search history.

(56) References Cited

U.S. PATENT DOCUMENTS

| | | | | |
|---|---|---|---|---|
| 6,081,890 A * | 6/2000 | Datta | | 713/1 |
| 6,088,759 A * | 7/2000 | Hasbun et al. | | 711/103 |
| 6,199,194 B1 * | 3/2001 | Wang et al. | | 717/118 |
| 6,247,168 B1 * | 6/2001 | Green | | 717/176 |
| 6,282,647 B1 * | 8/2001 | Leung et al. | | 713/100 |
| 6,412,040 B2 * | 6/2002 | Hasbun et al. | | 711/103 |
| 6,668,374 B1 * | 12/2003 | Sten et al. | | 717/173 |
| 7,188,238 B2 * | 3/2007 | Bulusu et al. | | 713/2 |
| 7,814,479 B2 * | 10/2010 | Douglas et al. | | 717/173 |
| 7,992,177 B2 * | 8/2011 | Perry et al. | | 725/81 |
| 2004/0230963 A1 * | 11/2004 | Rothman et al. | | 717/168 |
| 2005/0223291 A1 * | 10/2005 | Zimmer et al. | | 714/34 |

OTHER PUBLICATIONS

Agrawal et al., "Policy-Based Validation of SAN Configuration", 2004.*
Gorinsek et al., "Managing quality of service during evolution using component contracts", 2003.*
Marlborough, "SIP / H.323 / AIX telephone customization", 2005.*
Surewaard, "Development of the Remote Processor Programming (RePro) technique", 2001.*

* cited by examiner

*Primary Examiner* — Phillip Nguyen
(74) *Attorney, Agent, or Firm* — Steven Skabrat

(57) ABSTRACT

Dynamic updating of firmware in a processing system without performing a system reset may be accomplished by allocating memory space for updated firmware in a dynamic random access memory of the processing system during the system initialization process for the processing system; receiving the updated firmware during runtime of the processing system; validating the updated firmware; storing the updated firmware into the allocated memory space when the updated firmware is validated; and setting a pointer variable indicating the start of a portion of the firmware to point to the start of the updated firmware stored in the allocated memory space.

14 Claims, 7 Drawing Sheets

METHOD AND APPARATUS TO ENABLE DYNAMICALLY ACTIVATED FIRMWARE UPDATES

BACKGROUND

1. Field

The present invention relates generally to processing systems and, more specifically, to updating firmware within a processing system.

2. Description

High stability and availability are very important for certain processing systems, such as computer servers for example. Servers that advertise mission critical capabilities often require an up-time of 99.999% ("59s"). This means that during a given year, a server might be available to be brought off-line to update firmware or to perform routine maintenance for only five minutes to maintain the advertised level of service. However, it is possible that during the year updates to firmware may be needed. Traditionally, this requires the server to be brought down and restarted. Bringing the processing system down, updating the firmware, and performing a system reset operation might result in a server being out of service for longer than the advertised availability. Hence, a way to update the firmware without performing a system reset is desirable.

BRIEF DESCRIPTION OF THE DRAWINGS

The features and advantages of the present invention will become apparent from the following detailed description of the present invention in which.

DETAILED DESCRIPTION

An embodiment of the present invention comprises a method and apparatus for updating firmware in a processing system without performing a system reset. In an embodiment, the firmware may be immediately and dynamically updated by utilizing a code patching mechanism, thereby avoiding execution of a system reset. When the processing system is eventually rebooted, a new version of the firmware (which may include the functionality of the earlier update) may also be rewritten in non-volatile memory. By enabling dynamic upgradeability of the underlying firmware without incurring a reset, embodiments of the present invention bring a level of parity to the processing system with modern supported software constructs. For instance, this provides a seamless operation which can enable users to patch newly available firmware and make new functionality instantly available without a reboot.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
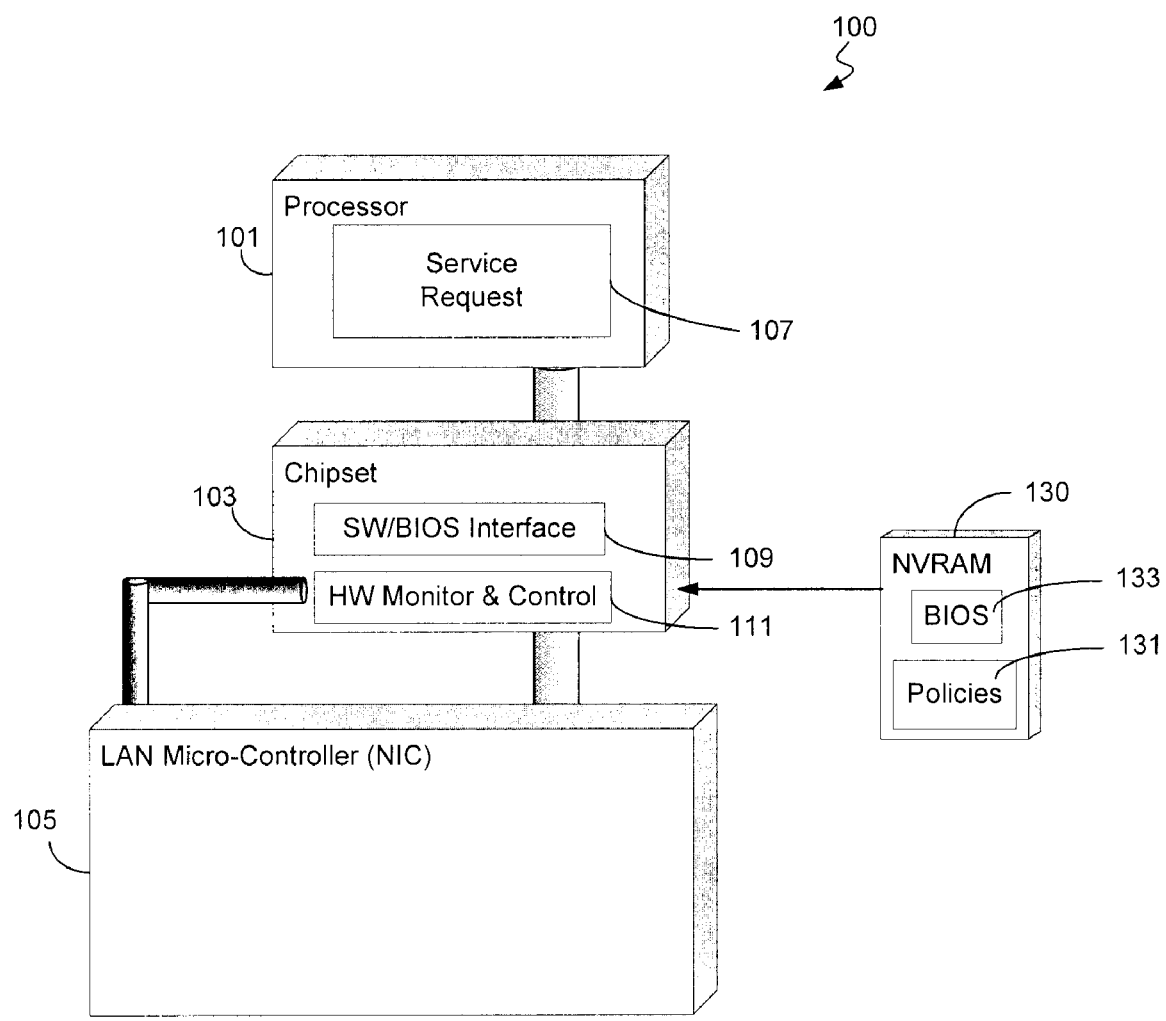
FIG. 1 is a diagram of a processing system according to an embodiment of the present invention.

FIG. 1 illustrates portions of an exemplary processing system environment 100 in which an embodiment of the present invention may reside. In an embodiment, a processing system 100 comprises a processor 101, a chipset 103, a non-volatile RAM memory (NVRAM) 130, such as flash memory, and an optional embedded microcontroller which may be a network interface card 105. Processor 101 may be any type of processor capable of executing software, such as a microprocessor, digital signal processor, microcontroller, or the like. Although FIG. 1 shows only one such processor 101, there may be one or more processors in the platform 100 and one or more of the processors may include multiple threads, multiple cores or the like. Processor may execute instructions comprising one or more service requests 107. In one embodiment, a service request may comprise a request to update the firmware stored in NVRAM, or a request to access a particular firmware module.

Microcontroller 105 may comprise a network interface card (NIC) or the like. The NIC 105 may be communicatively coupled to a remote server via a serial over local area network (LAN) interface (not shown) or an out of band (OOB) connection (not shown), as is conventional in the art. The OOB may utilize Transfer Control Protocol/Internet Protocol (TCP/IP), hypertext transfer protocol (HTTP) or Simple Object Access Protocol (SOAP), or another protocol. The NIC 105 may use other means to communicate over a network, for instance, Integrated Drive Electronics (IDE) redirection (not shown) or other means.

The chipset 103 typically has a software interface for the basic input output system (BIOS) 109 and hardware monitor and control means 111. The chipset is communicatively coupled to the NIC 105 and the processor 101. The chipset 103 may be coupled to the NVRAM 130, enabling it to access memory allocation policies 131. The SW/BIOS interface 109 may retrieve BIOS instructions 133 from the firmware (NVRAM 130).

The SW/BIOS interface 109 may further comprise pre-execution (PXE) drivers for the NIC 105 and other devices. By using PXE drivers, the processing system 100 can communicate with a network without requiring an OS agent. The PXE driver for the NIC 105 may use a network mini-stack rather than a full network stack. This means that all protocols may not be implemented on the stack. This may reduce the size and complexity of the PXE drivers. The SW/BIOS interface 109 may also further comprise interfaces to driver execution environment code modules in the BIOS, such as boot services and runtime services.

Figure 2:
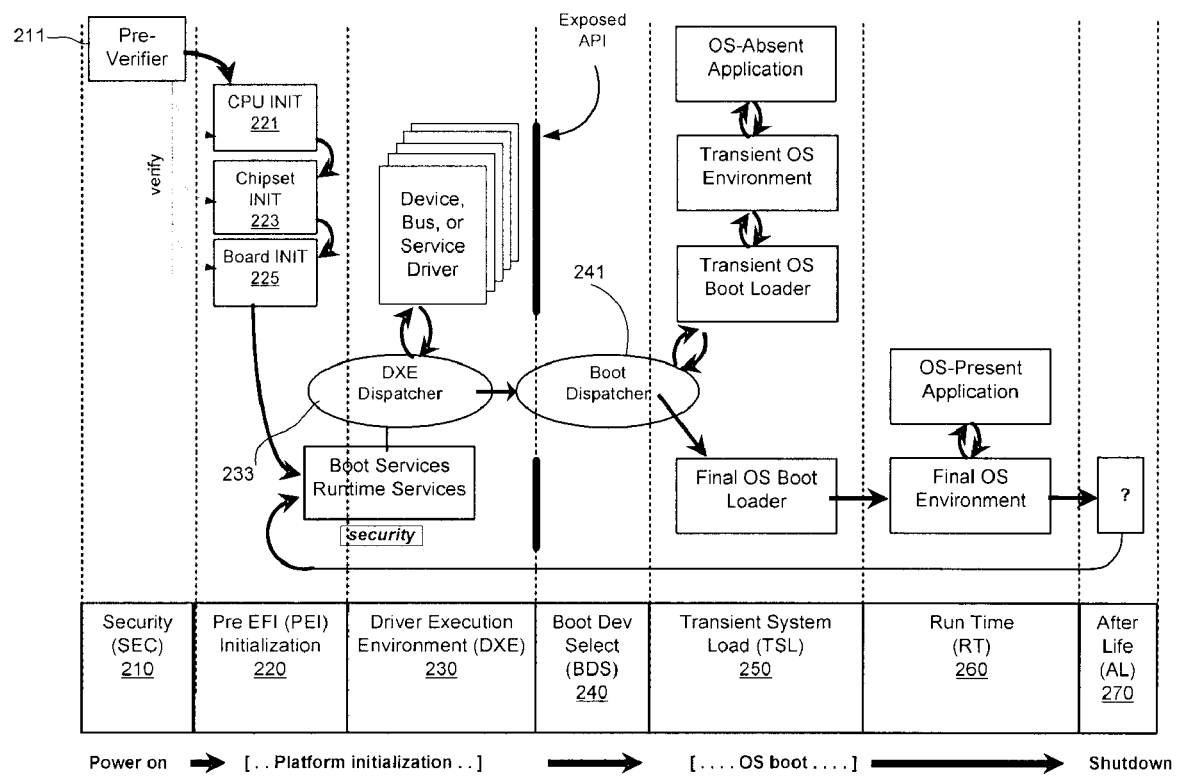
FIG. 2 is a diagram of firmware architecture according to an embodiment of the present invention.

FIG. 2 is a diagram of firmware architecture according to an embodiment of the present invention. An embodiment of the invention may be implemented on a processing system having an extensible firmware interface (EFI) architecture. Referring to FIG. 2, there is shown a block diagram illustrating the flow of execution of an EFI system according to an embodiment of the invention. For purposes of this discussion, the focus will be on the processes required to boot the platform.

In existing multi-core systems, one processor is chosen to boot the processing system, called the boot strap processor (BSP). Upon boot, the BSP will serially perform all boot tasks. Typically, in a processing system having an EFI architecture, the security processing (SEC) 210 phase is executed during early boot.

A pre-verifier, or Core Root of Trust for Measurement (CRTM) 211 may be run at power-on at SEC phase 210. A pre-verifier comprises a module that initializes and checks the environment. In existing systems, the pre-verifier and SEC phase comprise the Core Root of Trust for Measurement (CRTM), namely enough code to startup a Trusted Platform Module (TPM) and perform a hash-extend of BIOS. More information on TPMs may be found at URL www*trustedcomputinggroup*org. The processor 221, chipset 223 and board 225 may be initialized in the Pre-EFI Initialization (PEI) stage 220. Board init 225 is responsible for basic initialization of the baseboard components and finding and initializing system memory (RAM). Once system memory is initialized, the BIOS may be copied to system RAM from NVRAM (e.g., flash memory) and execute from RAM. The driver execution environment (DXE) dispatcher 233 is launched at the end of the PEI phase 220 to commence the DXE phase 230, typically by a module named Dxelpl. However, the DXE dispatcher cannot be launched until system RAM is found and initialized. Note that periods have been replaced with asterisks in URLs in this document to avoid inadvertent hyperlinks.

In embodiments of the invention, the operations at the PEI phase 220 may be run from cache as RAM (CAR) before proceeding to the driver execution environment (DXE) phase 230. Runtime services and boot services may be available anytime during or after the DXE phase during platform initialization. The DXE dispatcher launches the boot dispatcher 241 at the boot device select (BDS) phase. The OS boots at the transient system load (TDL) stage 250.

The boot device select (BDS) phase 240 is responsible for choosing the appropriate operating system. Upon a system failure during OS runtime (RT phase 260), such as what is referred to as BSOD (Blue Screen Of Death) in Windows® or Panic in Unix/Linux, the firmware PEI and DXE flows may be reconstituted in an after life (AL phase 270) in order to allow OS-absent recovery activities.

Figure 3:
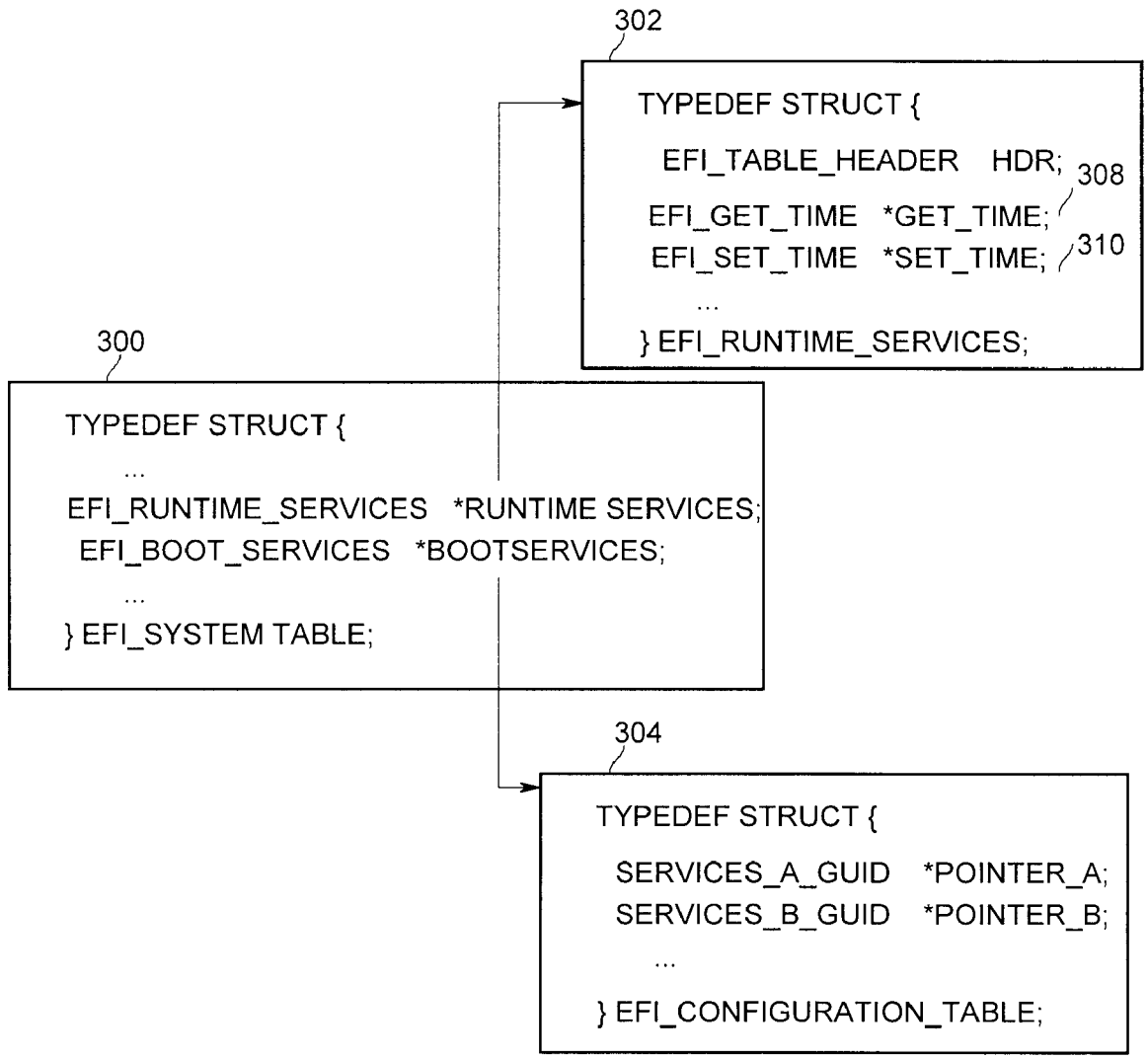
FIG. 3 is a diagram of type definitions according to an embodiment of the present invention.

FIG. 3 is a diagram of type definitions according to an embodiment of the present invention. In one embodiment, the BIOS 133 may define a system table 300 having interfaces for runtime services 302 and boot services 304. Runtime services 302 may comprise one or more services such as get_time 308 and set_time 310 in a runtime services table as shown. Other services may also be supported. Each runtime service may be implemented as a code module within the BIOS firmware stored in NVRAM 130. Similarly, boot services 304 may comprise one or more services in a configuration table as shown. Each boot service may be implemented as a code module within the BIOS firmware stored in NVRAM 130. One or more of the runtime services and/or boot services may need to be updated. In embodiments of the present invention, updating of these services may be performed without requiring a reset of the processing system.

Figure 4:
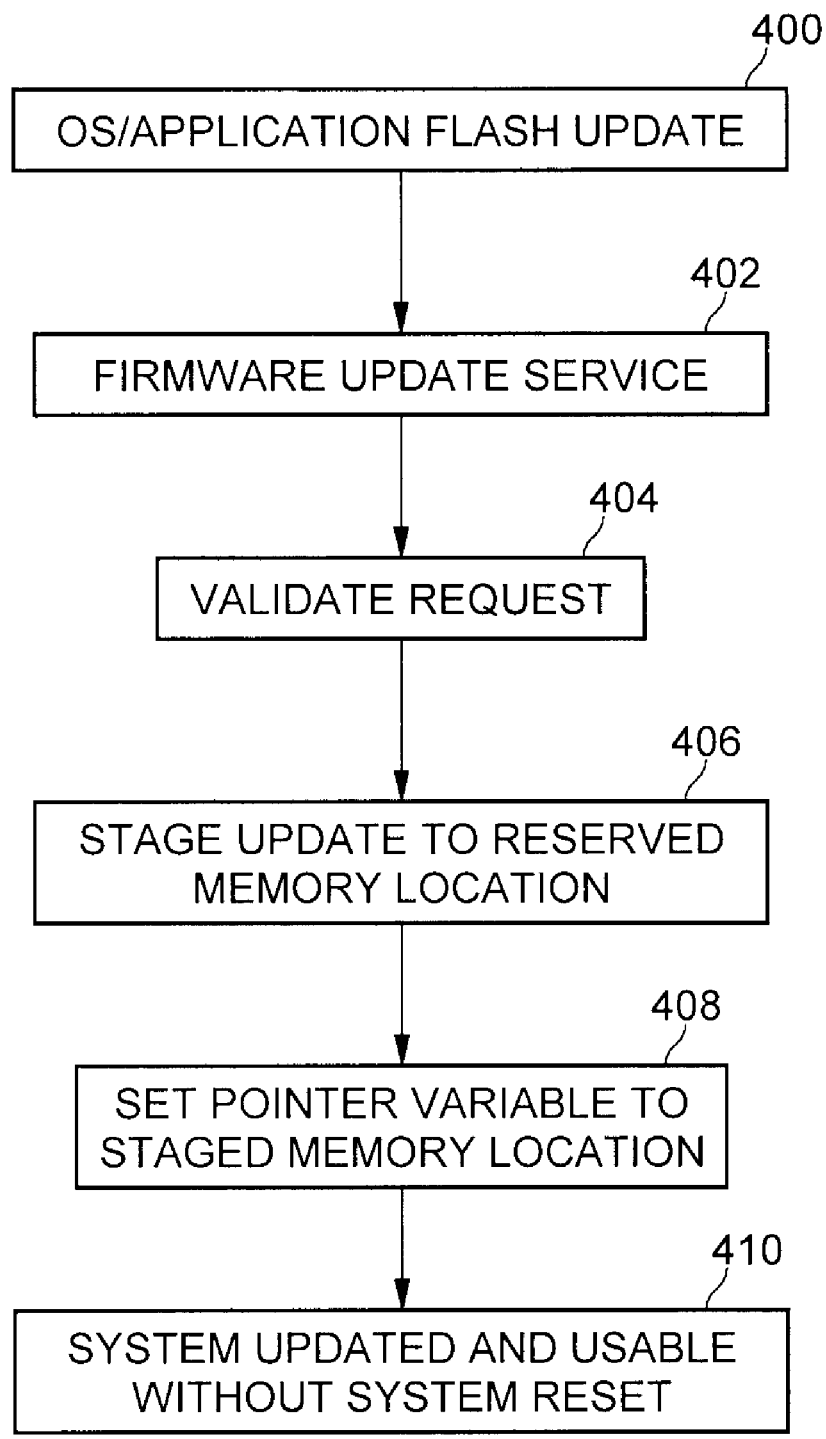
FIG. 4 is a flow diagram of a dynamic firmware updating call according to an embodiment of the present invention.

FIG. 4 is a diagram of a dynamic firmware updating call according to an embodiment of the present invention. At block 400, an operating system (OS) or an application program may determine that a particular portion of code and/or data must be updated in the BIOS originally stored in the flash memory (i.e., NVRAM 130) and typically shadowed in a memory of the processing system such as a dynamic random access memory (DRAM). The OS or application program module calls a firmware update service at block 402 to make the change. The firmware update service validates the request at block 404 to ensure that the request is from a legitimate requester within the processing system. At block 406, the firmware update may be staged to a reserved memory location within the DRAM. Staging involves storing new code and/or data representing a selected updated firmware module into the memory. At block 408, a pointer variable may be set to point to the staged memory location. The pointer variable may be used subsequently to access the new code and/or data at the staged memory location instead of the old code and/or data from the BIOS. In one embodiment, the pointer variable comprises a patched entry point for a call to a particular BIOS service. At block 410, the system is considered to be updated and usable without a system reset.

Figure 5:
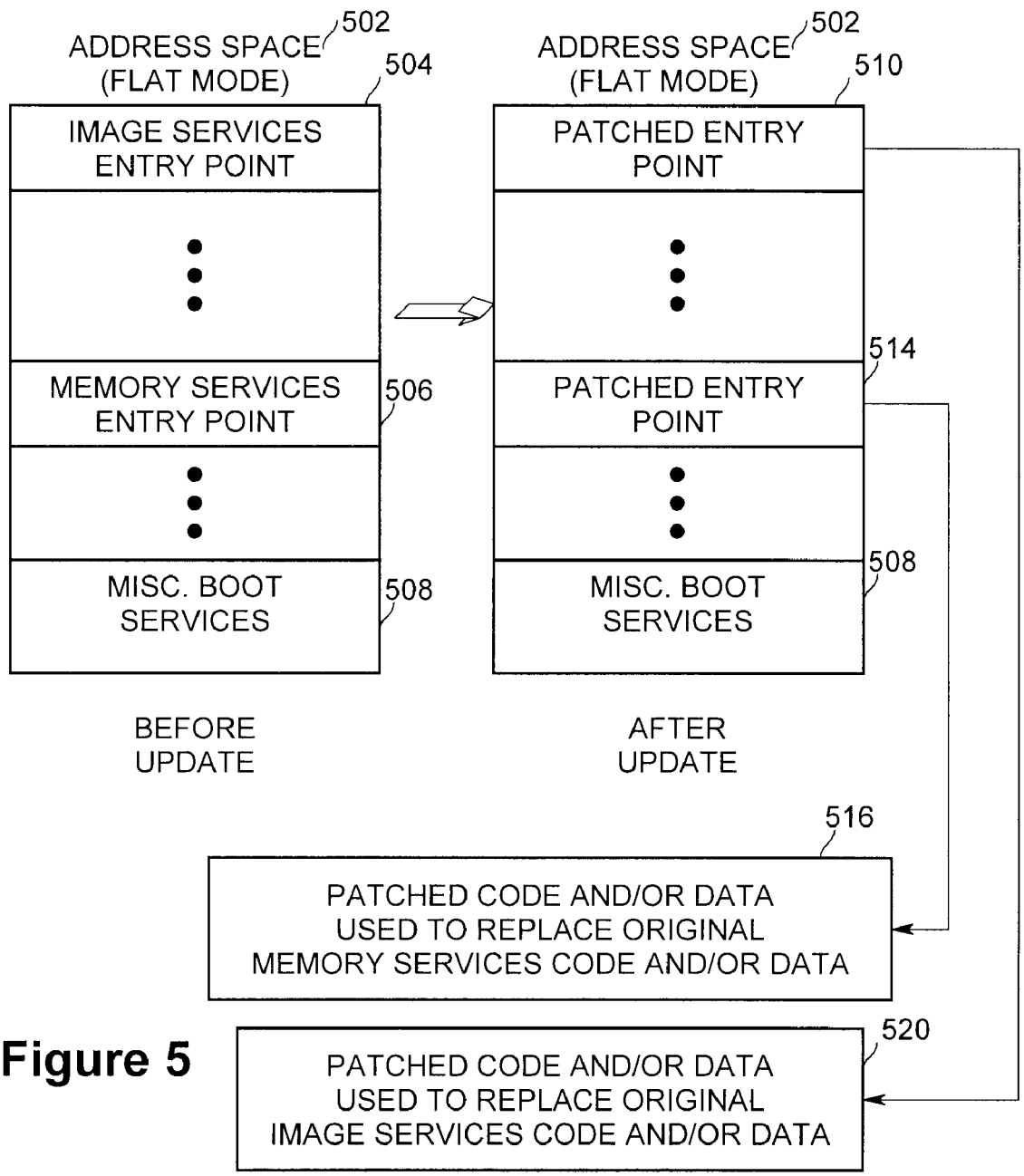
FIG. 5 is a diagram of dynamic firmware updating according to an embodiment of the present invention.

FIG. 5 is a diagram of dynamic firmware updating according to an embodiment of the present invention. Before an update, the address space (in flat mode) of the memory may be as shown at 502. BIOS code and/or data may be shadowed in main memory (i.e., DRAM). For example, an image services entry point 504 may be located starting at a particular location in memory as shown at 504. The image services code and/or data may reside starting at this memory location. A memory services entry point 506 may be located starting at another memory location as shown. Similarly, miscellaneous boot services 508 may be located starting at yet another memory location. In an embodiment of the present invention, the entry point for a service may be securely changed to point to or jump to another location in memory to implement the firmware update. Secure patched code and/or data may be located at the patched entry point location (due to earlier staging as discussed at block 406 of FIG. 4). For example, after the dynamic firmware update, patched entry point 510 may now send a caller of the image services function to patched code and/or data 520 used to replace the original image services code. Similarly, patched entry point 514 may now send a caller of the memory services function to patched code and/or data 516 used to replace the original memory services code. In either case, when the patched code and/or data are done being accessed, control may return back to the caller as normal.

Figure 6:
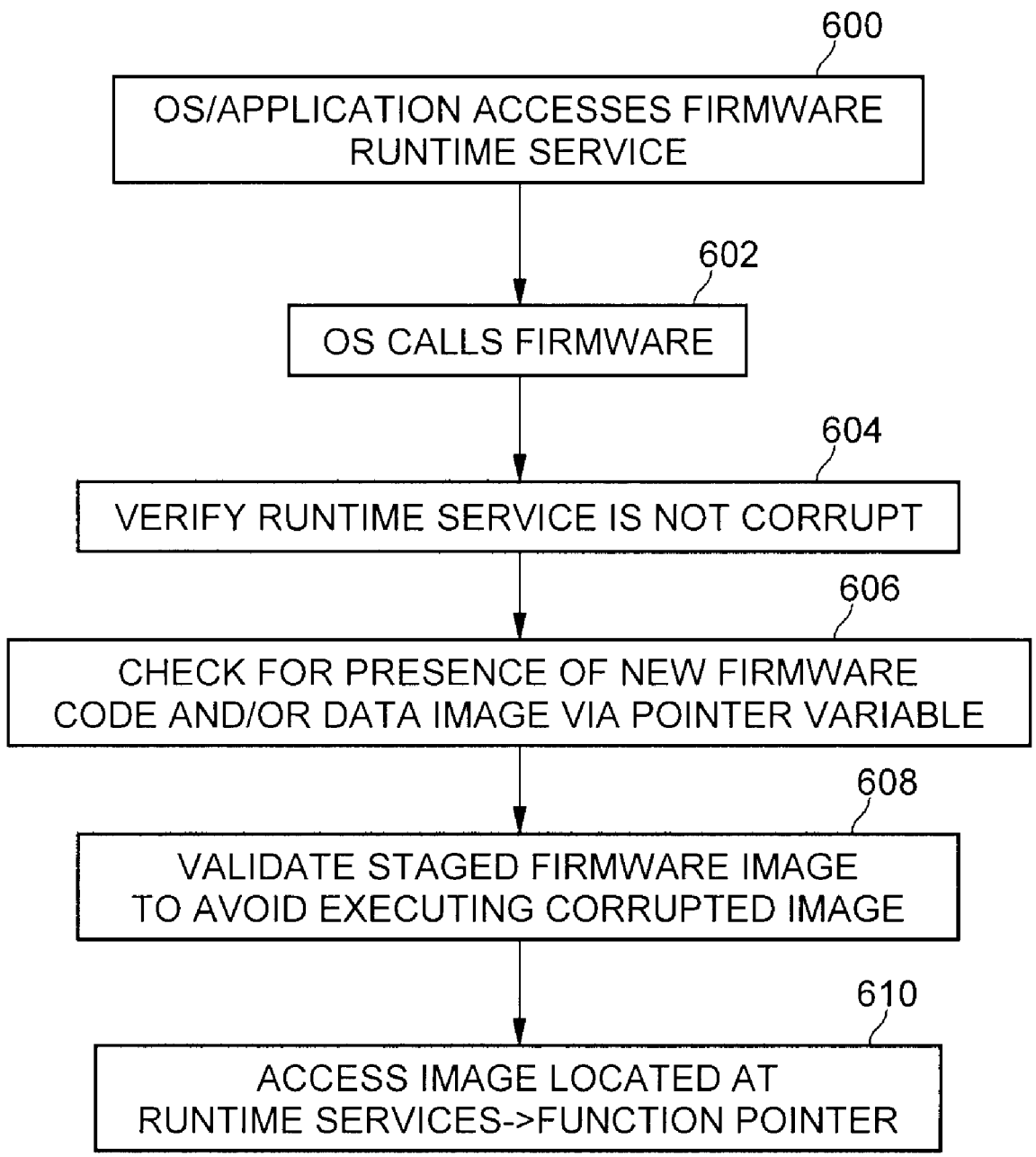
FIG. 6 is a flow diagram of a firmware function call after dynamic updating according to an embodiment of the present invention.

FIG. 6 is a diagram of a firmware function call after dynamic updating according to an embodiment of the present invention. At block 600, the OS or an application program accesses a firmware runtime service. At block 602, the OS calls the desired firmware runtime service. If the application program initiates this activity, the application program calls an appropriate OS routine, which then calls the firmware runtime service. At block 604, the runtime service code may be verified to ensure that it is not corrupt. This may be accomplished in one embodiment by verifying a digital signature of the runtime service code and/or data image in one embodiment. In other embodiments, other validations or verifications known in the art may be employed. In one embodiment, this verification may be performed by the OS. At block 606, the presence of a new runtime service code and/or data image may be checked for by inspecting the relevant pointer. At block 608, the firmware image previously staged at a memory location indicated by the pointer may be validated to avoid executing a corrupted image. In one embodiment, this may be performed by the runtime service. Finally, at block 610, the firmware code and/or data image located at the memory location specified by the runtime services function pointer (e.g., patched entry point) may be accessed.

Figure 7:
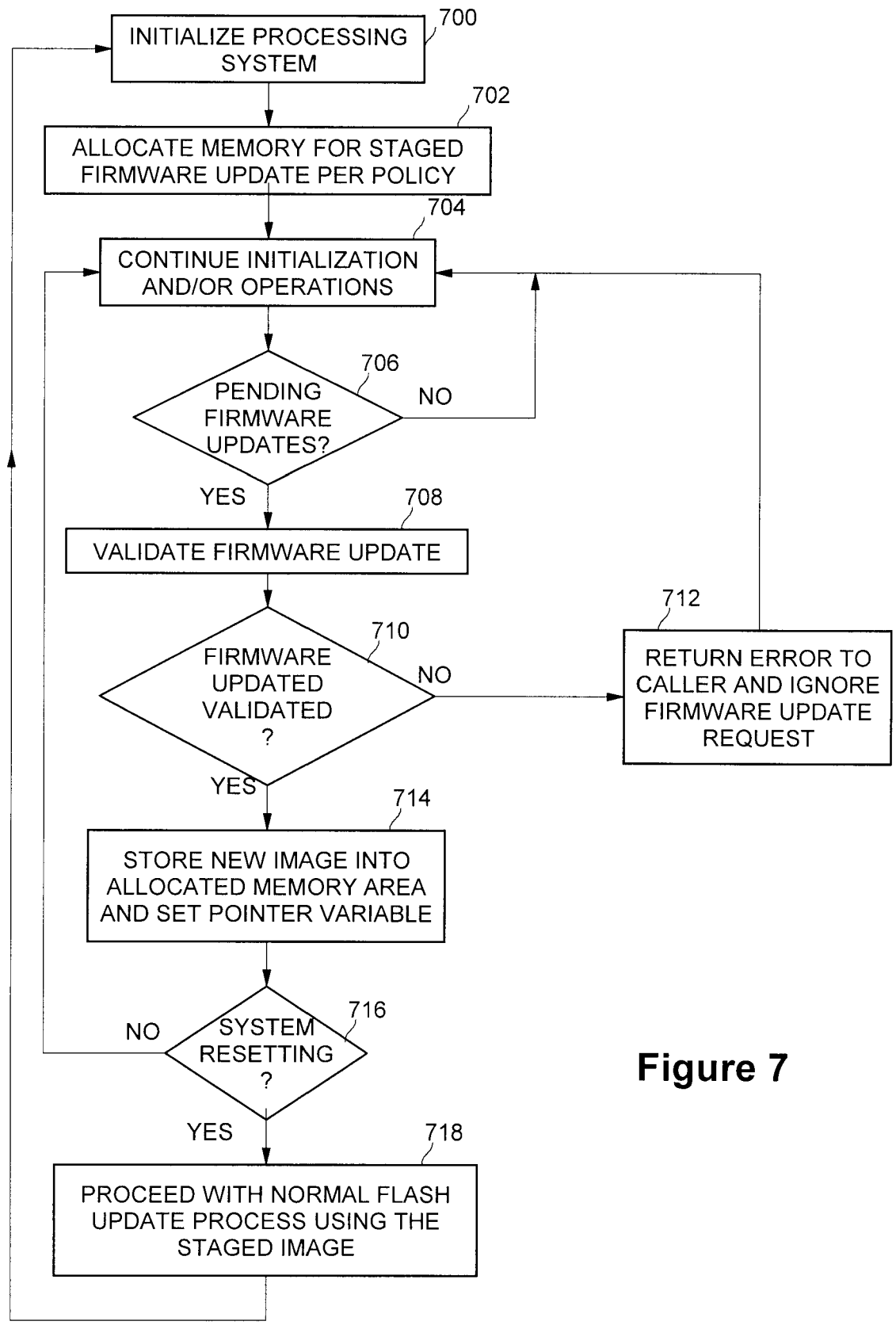
FIG. 7 is a flow diagram illustrating an embodiment of the present invention.

FIG. 7 is a flow diagram illustrating an embodiment of the present invention. At block 700, the processing system is initialized. At block 702, memory in main memory (e.g., DRAM), may be allocated for staging a firmware update per a defined policy. This allocation may be done at system initialization time of the processing system. To further enable dynamic function update support, the runtime services must use a common segment of code which serves several purposes. The common code segment honors a global pointer variable which points to the firmware staged area and uses it. The common code segment self-checks the destination firmware code prior to passing control to it. This ensures that corruption hasn't occurred in the staging area. Core services (which may include both the firmware and the OS) ensure that the dynamic functions referenced by the runtime services table or the system configuration table (e.g., as shown in FIG. 3) all have this valid preamble code prior to passing control to it.

At block 704, initialization and/or subsequent booting or runtime operations may continue. At block 706, a check may be made to determine if there are any pending requests from an application program or the OS to update the firmware. If not, operations continue at block 704. If there is a pending firmware update request, then the firmware update may be validated at block 708. The incoming code and/or data image may be analyzed to verify that it has the appropriate digital signature. This is to avoid the corruption of the firmware. Next, at block 710, if the firmware update is not validated, an error message may be returned to the caller and the firmware update request may be ignored at block 712. Operations may then continue at block 704. If the firmware update is validated, the new firmware code and/or data image may be stored into the allocated memory area and the corresponding pointer variable (e.g., patched entry point) may be set at block 714. At block 716, if the system is being reset (e.g., by manual action by a system operator), then the normal flash memory update process may be performed at block 718 using the updated staged firmware image. Thus, the updated code and/or data may be stored in NVRAM and after the system reset the latest code and/or data may be accessed from the NVRAM. If the system is not being reset, then operations continue at block 704.

In typical processing systems (such as servers), the firmware cannot allocate more memory after the system is initialized and control is transferred to the OS. However, in embodiments of the present invention, updated firmware code and/or data images may be mapped into a selected area of memory for use by the OS. This reserved area of memory may be accessed by patching entry points for firmware runtime services. Furthermore, by checking the digital signature of patchable firmware services, system security may be maintained.

Although the operations discussed herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action and produce a result.

What is claimed is:

1. A method of dynamically updating firmware in a processing system without performing a system reset comprising:

allocating memory space for updated firmware in a dynamic random access memory of the processing system during system initialization process for the processing system;

receiving the updated firmware during runtime of the processing system;

validating the updated firmware;

storing the updated firmware into the allocated memory space when the updated firmware is validated; and setting a pointer variable indicating the start of a portion of the firmware to point to the start of the updated firmware stored in the allocated memory space, wherein the portion of the firmware comprises a runtime service;

calling, by an operating system, the runtime service;

verifying that the runtime service is not corrupt;
checking for the presence of the updated firmware in the dynamic random access memory associated with the called runtime service;
validating the updated firmware if present;
accessing the updated firmware to be used over the firmware using the pointer variable when the updated firmware is validated without performing a system reset.

2. The method of claim 1, wherein the pointer variable comprises a patched entry point of the portion of the firmware.

3. The method of claim 1, wherein the processing system comprises an extensible firmware interface (EFI) architecture, and the runtime service comprises at least one of an image service and a memory service.

4. The method of claim 1, further comprising updating the firmware on a non-volatile memory of the processing system using the updated firmware stored in the dynamic random access memory upon a system reset.

5. The method of claim 1, wherein memory space is allocated according to a policy.

6. A processing system comprising:
a non-volatile memory adapted to store firmware;
a dynamic random access memory adapted to stored updated firmware; and
a processor adapted to dynamically update firmware without performing a system reset by
allocating memory space for updated firmware in the dynamic random access memory during system initialization process for the processing system;
receiving the updated firmware during runtime of the processing system;
validating the updated firmware;
storing the updated firmware into the allocated memory space when the updated firmware is validated; and
setting a pointer variable indicating the start of a portion of the firmware to point to the starting of the updated firmware stored in the allocated memory space, wherein the portion of the firmware comprises a runtime service;
calling, by an operating system, the runtime service;
verifying that the runtime service is not corrupt;
checking for the presence of the updated firmware in the dynamic random access memory associated with the called runtime service;
validating the updated firmware if present; and
accessing the updated firmware to be used over the firmware using the pointer variable when the updated firmware is validated without performing a system reset.

7. The processing system of claim 6, wherein the pointer variable comprises a patched entry point of the portion of the firmware.

8. The processing system of claim 6, wherein the processing system comprises an extensible firmware interface (EFI) architecture, and the runtime service comprises at least one of an image service and a memory service.

9. The processing system of claim 6, wherein the processor is further adapted to update the firmware on a non-volatile memory of the processing system using the updated firmware stored in the dynamic random access memory upon a system reset.

10. The processing system of claim 6, wherein memory space is allocated according to a policy.

11. An article comprising:
a machine accessible medium containing instructions, which when executed by a processor in a processing system, result in dynamically updating firmware in the processing system without performing a system reset by
allocating memory space for updated firmware in a dynamic random access memory of the processing system during system initialization process for the processing system;
receiving the updated firmware during runtime of the processing system;
validating the updated firmware;
storing the updated firmware into the allocated memory space when the updated firmware is validated; and
setting a pointer variable indicating the start of a portion of the firmware to point to the start of the updated firmware stored in the allocated memory space, wherein the portion of the firmware comprises a runtime service;
calling, by an operating system, the runtime service;
verifying that the runtime service is not corrupt;
checking for the presence of the updated firmware in the dynamic random access memory associated with the called runtime service;
validating the updated firmware if present; and
accessing the updated firmware to be used over the firmware using the pointer variable when the updated firmware is validated without performing a system reset.

12. The article of claim 11, wherein the pointer variable comprises a patched entry point of the portion of the firmware.

13. The article of claim 11, wherein the processing system comprises an extensible firmware interface (EFI) architecture, and the runtime service comprises at least one of an image service and a memory service.

14. The article of claim 11, further comprising instructions to update the firmware on a non-volatile memory of the processing system using the updated firmware stored in the dynamic random access memory upon a system reset.

* * * * *